(No Model.)
A. O. GRANGER.
PIPE JOINT.
No. 310,049. Patented Dec. 30, 1884.
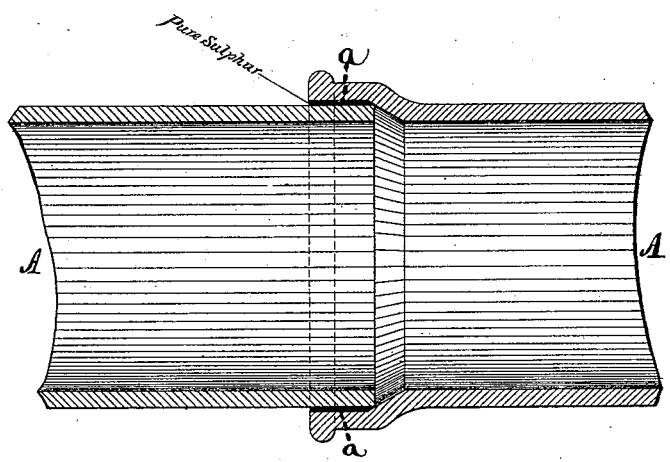

UNITED STATES PATENT OFFICE.

ARTHUR O. GRANGER, OF PHILADELPHIA, PENNSYLVANIA, ASSIGNOR TO A. O. GRANGER & CO., OF SAME PLACE.

PIPE-JOINT.

SPECIFICATION forming part of Letters Patent No. 310,049, dated December 30, 1884.

Application fi'ed March 6, 1883. (No model.)

*To all whom it may concern:*

Be it known that I, ARTHUR O. GRANGER, a citizen of the United States, residing in the city and county of Philadelphia, State of Pennsylvania, have invented a new and useful Improvement in the Method of and Means for Jointing Pipes, which improvement is fully set forth in the following specification and accompanying drawing, which represents a section of a pipe-joint embodying my invention.

Heretofore pipe-joints of the spigot and faucet pattern have been made by pouring molten lead into the joints, first driving in hemp to keep the lead from running into the pipes, and when the lead is cool calking it into the joints. This is a slow and expensive operation, and if the calking is omitted from any part of the joint the joint will leak owing to the shrinkage of the cold lead. Furthermore, in order to calk the joints, man-holes are required to be dug in the trench to give the calker room to use his tools. A composition of sulphur and pulverized iron or copper pyrites has also been used for pipe-joints; but constant stirring of the mass and great care in applying said composition fail to produce uniformly tight joints.

My invention consists of the use of pure sulphur for jointing pipes.

Referring to the drawing, A represents two lengths of pipe, and *a* the sulphur joint thereof. The sulphur, in a molten condition, is poured or packed into the joint-space between the pipes, and obviates calking. It is impervious to gas, and permits the jointing spaces to be reduced, so that thin layers or filling of the sulphur may be used—say one-eighth of an inch or less in thickness—there being a saving of jointing material and adaptability of making the pipes of less diameter at their bells or ends. Furthermore, the joints become dense, avoiding coarse crystallization, whereby they are enabled to stand a pressure of several hundred pounds to the square inch, and leakage is avoided.

I am aware that sulphur is well known for connecting iron rods, &c., with stone bases; but I am not aware that such material in a pure state has been used to form a packing or filling between pipes, so as to close the joint both from the inside and outside.

Having thus described my invention, what I claim as new, and desire to secure by Letters Patent, is—

A pipe-joint consisting of pure sulphur, substantially as described.

A. O. GRANGER.

Witnesses:
JOHN A. WIEDERSHEIM,
A. P. GRANT.